US006146562A

United States Patent [19]
Hettinga

[11] Patent Number: 6,146,562
[45] Date of Patent: Nov. 14, 2000

[54] METHOD OF INJECTION MOLDING AN ARTICLE WITH A CELLULAR DENSITY DISTRIBUTION WHICH GRADUALLY VARIES BETWEEN A HIGH DENSITY CELLULAR EXTERIOR AND A LOW DENSITY CELLULAR INTERIOR

[76] Inventor: Siebolt Hettinga, 2123 NW. 111th St., Des Moines, Iowa 50325-3788

[21] Appl. No.: 09/042,342

[22] Filed: Mar. 13, 1998

[51] Int. Cl.[7] .................................................. B29C 44/06
[52] U.S. Cl. ....................... 264/45.5; 264/45.1; 264/54; 264/328.7
[58] Field of Search ................... 264/45.1, 45.5, 264/55, 54, 328.7

[56] References Cited

U.S. PATENT DOCUMENTS

| | | | |
|---|---|---|---|
| 3,767,742 | 10/1973 | Robin | 264/328.7 |
| 3,793,415 | 2/1974 | Smith | 264/328.7 |
| 3,825,637 | 7/1974 | Robin | 264/328.7 |
| 5,437,823 | 8/1995 | Hettinga et al. | 264/45.5 |
| 5,876,641 | 3/1999 | Le Clair et al. | 264/46.6 |
| 5,972,259 | 10/1999 | Hettinga | 264/45.5 |

FOREIGN PATENT DOCUMENTS

0 035 916  9/1981  European Pat. Off. ............ 264/328.7

*Primary Examiner*—Allan R. Kuhns
*Attorney, Agent, or Firm*—Brian J. Laurenzo; Michael C. Gilchrist

[57] ABSTRACT

A method for producing an injection molded article with a gradually varying cellular density distribution, whereby the cellular density distribution varies between a first cellular structure of a high density and a second cellular structure of a relatively lower density. The method comprises forming a mold cavity be engaging a first mold section with a second mold section and injecting into the mold cavity an injection mixture which contains a blowing agent. A gradually varying density distribution is created according to a predetermined control function which depends on the mold cavity volume and the injection rate of the injection mixture.

18 Claims, 5 Drawing Sheets

METHOD OF INJECTION MOLDING AN ARTICLE WITH A CELLULAR DENSITY DISTRIBUTION WHICH GRADUALLY VARIES BETWEEN A HIGH DENSITY CELLULAR EXTERIOR AND A LOW DENSITY CELLULAR INTERIOR

BACKGROUND OF THE INVENTION

The invention relates to a method for producing an injection molded article with a desired cellular density distribution, and more particularly, to a method for producing the injection molded article whereby the cellular structure of the injection molded article gradually varies between a cellular structure of high density at the perimeter of the molded article to a cellular structure of relatively low density in the interior of the molded article.

Plastic injection molding machines generally include a mold unit and an injection assembly. The mold unit typically contains a stationary mold section and a movable mold section, whereby the injection molding machine can form a mold cavity by engaging the movable mold section with the stationary mold section. The stationary mold section generally contains a runner system that allows for injection of an injection mixture into the mold cavity. An injection nozzle engages with the stationary mold section runner system thereby allowing injection of the injection material into the mold cavity.

In the injector assembly, the injection mixture is prepared for injection. Maintaining the injection mixture under pressure, and at the desired temperature, controls the viscosity of the injection mixture prior to injection. It is often desired to create a plastic article of a decreased density, as the decreased density reduces the amount of material needed to create the article and it also reduces the weight of the article. It is well known in the art to combine a blowing agent with the injection material to accomplish this decrease in density. Most blowing agents are heat activated and produce bubbles, or foam, within the plastic when the blowing agent activates. Therefore, the blowing agents activate above a specific activation temperature. If the temperature of the blowing agent is maintained below the specific activation temperature the blowing agent does not activate. Additionally, the bubbles produced by the blowing agent will generally be evenly distributed throughout the plastic article after the blowing agent is activated. As the plastic material cools and hardens, these bubbles form a cellular structure throughout the plastic article of a given density.

It is generally preferable that the outer surface of the injection molded article be smooth and uniform. This smooth and uniform outer shell gives the plastic article a more aesthetically pleasing appearance and a wear resistant outer covering. Accordingly, there is a need to create a plastic injection molded article with an inner low density cellular core and a more dense outer skin that is free from the cellular structure created by the blowing agent. U.S. Pat. No. 5,437,823 shows how to make a plastic article with a dense unfoamed outer skin and a foamed interior. This is achieved by injecting the plastic material and blowing agent into the mold cavity under high enough pressure to prevent the blowing agent from forming bubbles. The plastic material is maintained at a high pressure while a skin forms along the walls of the mold cavity. Then the pressure is decreased and the blowing agent is allowed to foam in the interior of the plastic article.

This process, however, generally results in a molded article with a uniform low density core and an abrupt transition to a smooth high density exterior. Injection molded articles molded according to this process are typically not very compressible and do not have a good memory for compressibility, even when molded from relatively pliable thermoplastic materials. In many instances it is desirable to produce an injection molded plastic article with a high density smooth outer cellular structure and a relatively lower density cellular structure at the core, which is compressible and has a memory for compressibility. Consequently, there is a need to produce an injection molded article with a tough wear resistant exterior surface that retains a cushion feel when under a load.

Further, this type of process performed with substantially rigid thermoplastic materials, while reducing the weight of the articles over articles produced without blowing agents, still produces somewhat heavy articles and cannot distribute the weight within the article to produce area of varying density. For example, floats utilizes in a wide variety of uses must be very light weight puncture resistant and often must be weighted such that some portions of the float are lighter than others. Floats are commonly used in toilets, gas tanks, carburetors, cooling towers, humidifiers, ice making equipment, car wash equipment, swimming pool equipment, and a host of other applications that require liquid sensing and/or liquid metering. These floats are typically constructed of copper, steel, nickel, rubber, polystyrene, or urethane foam. Many of these materials, however, are heavy, expensive, difficult to manufacture, and incapable of construction with varying densities.

SUMMARY OF THE INVENTION

An object of the present invention comprises providing a method to injection mold articles with a relatively low density cellular interior structure.

A further object of the present invention comprises providing a method to injection mold an article with a smooth high density outer cellular structure.

An additional object of the present invention comprises providing a method to injection mold an article with a gradual transition between the relatively low density cellular interior structure and the smooth high density cellular exterior structure.

Another object of the present invention comprises providing a method to injection mold an article with a tough wear resistance cover and a compressible core.

A further object of the present invention comprises providing a method to injection mold articles with a very low weight.

Yet another object of the present invention comprises providing a method to injection mold articles with the weight distributed such that some areas of the article are lighter than others.

These and other objects of the present invention will become apparent to those of ordinary skill in the art upon reference to the following specification, drawings, and claims.

The present invention proposes to overcome the difficulties encountered heretofore. To this end, an article is molded according to an injection molding process that utilizes a movable mold section and a stationary mold section, which engage to form a mold cavity. An injection means injects an injection mixture, containing a blowing agent, into the mold cavity. A cellular density distribution is created by varying the injection rate and the volume of the mold cavity according to a predetermined control function. The cellular density distribution of the injection molded article comprises a high density cellular structure at the perimeter of the injection molded article, a relatively low density cellular structure at the interior of the injection molded article, and a gradual transitional area between the low density and high density cellular structures.

DETAILED DESCRIPTION OF THE INVENTION

Figure 1:
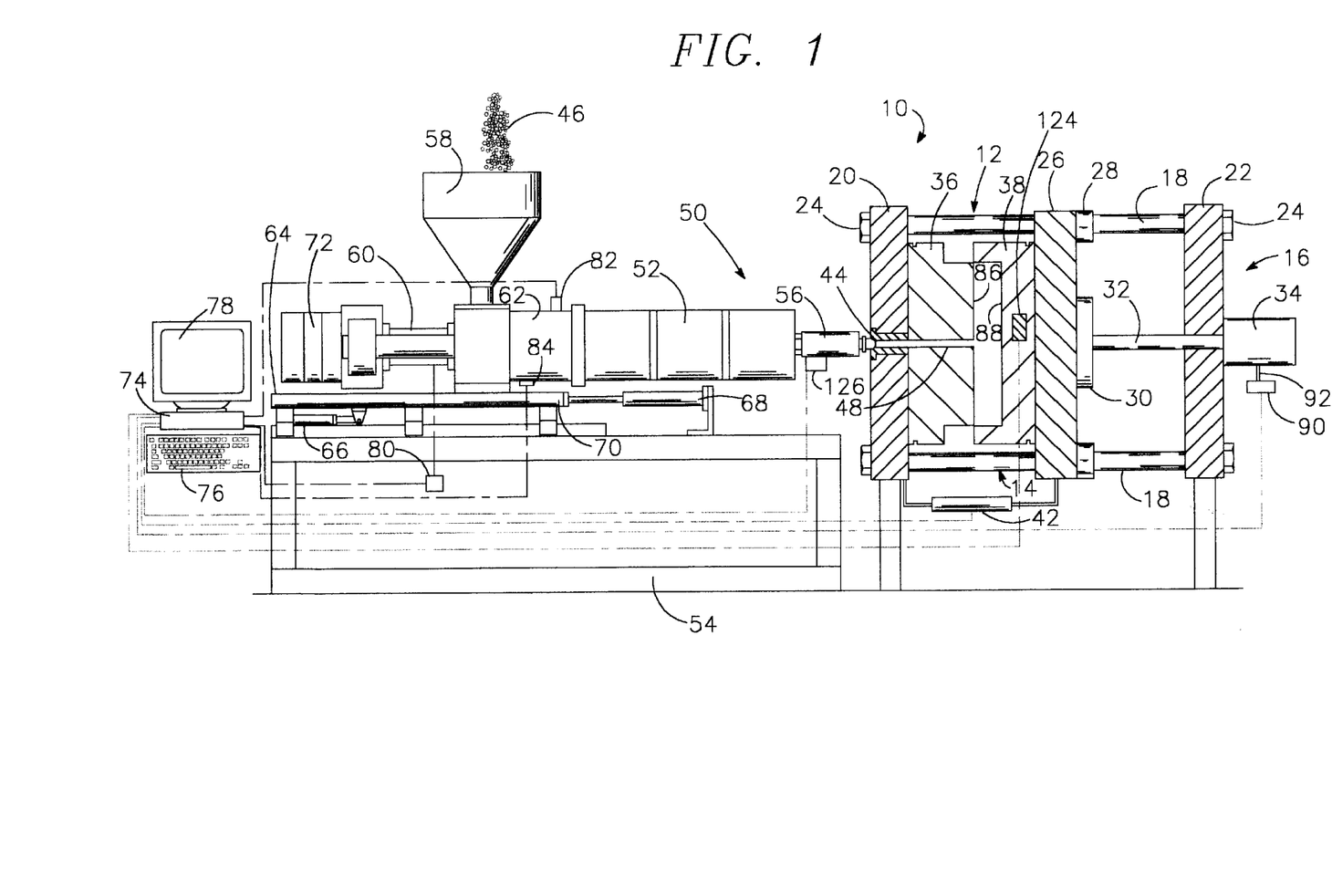
FIG. 1 is a side elevation view of an injection molding machine.

Referring to the drawings, a mold apparatus 10 is shown including a mold unit 12, a mold frame 14, and a hydraulic piston 16 (FIG. 1). The mold frame 14 consists of four cylindrical support bars 18 which are secured to a first plate 20 and to a second plate 22 by means of nuts 24. A mold carriage 26 is slideably attached to the support bars 18 through bores which pass through the corners of the mold carriage 26. Support blocks 28 are provided with bores and mounted to the corners of the mold carriage 26 to add extra support to the mold carriage 26 as it slides along the support bars 18. A platen 30 is secured to the mold carriage 26 to evenly distribute force over the mold carriage 26. Secured to the platen 30 is a piston ram 32. The piston ram 32 passes through a bore in the center of the second plate 22 and is connected to a hydraulic cylinder 34. The hydraulic cylinder 34, piston ram 32, traverse valve 92, and variable vane, hydraulic pump 90 make up the hydraulic piston 16. The hydraulic piston 16 is in connection with a central processing unit 74, and can be controlled through the central processing unit 74.

A first mold section 36 is mounted to the first plate 20 in alignment with a second mold section 38 which is mounted to the mold carriage 26. As the hydraulic piston 16 pushes the mold carriage 26 toward the first plate 20, the first mold section 36 fits into seated engagement with the second mold section 38 to form a mold cavity 40 therebetween. As shown in FIGS. 2a–b, 3a–b, and 4a–b the volume of the mold cavity 40 may be increased or decreased by moving the second mold section 38 away from or toward the first mold section 36.

A linear actuator 42 is mounted between both the first plate 20 and mold carriage 26 to monitor the distance between these two items to allow calculation of the volume of the mold cavity 40 when the second mold section 38 is placed at various distances relative to the first mold section 36. The linear actuator 42 is in connection with the central processing unit 74 in order to give feedback to the central processing unit 74 as to the position of the first mold section 36 relative to the second mold section 38. It is contemplated that the linear actuator 42 could be located between the second plate 22 and the mold carriage 26, or between any two points that would give feed back as to the position of the first mold section 36 relative to the second mold section 38. A nozzle inlet 44 is located in the center of the first plate 20 to allow an injection mixture 46 to pass into a mold inlet 48 located in the first mold section 36 and thereafter into the mold cavity 40.

Figure 2A:
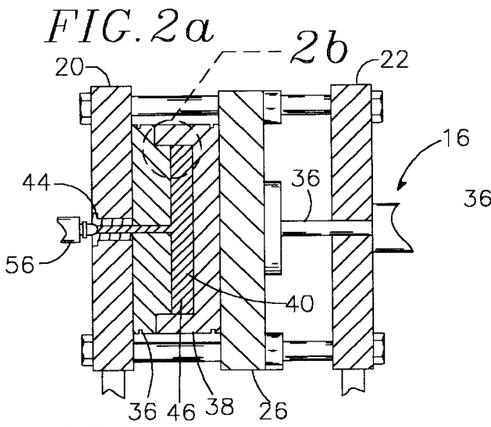
FIG. 2a is a cross-sectional view of the mold unit of the injection molding machine of FIG. 1 during a first molding period.

Provided for operable engagement with the nozzle inlet 44 is an injection assembly 50 which prepares and injects the injection mixture 46 into the mold cavity 40 (FIG. 1, FIG. 2a). The injection assembly 50 is provided with an injection barrel 52 supported by a main frame 54. A nozzle unit 56 is mounted at one end of the injection barrel 52 and a hopper 58 is mounted to the top if the injection barrel 52. Positioned coaxially within the injection barrel 52 is a reciprocating screw 60 with attached flights (not shown) for plasticizing and moving the injection mixture 46 toward the injection barrel 52 and nozzle unit 56. A variable volume, pressure compensated hydraulic pump 62 is secured to the injection barrel 52 and operates to move the injection screw 60 relative to the injection barrel 52 during the injection molding process. The injection assembly 50 is provided with a large rotational motor 72 which turns the injection screw 60 to plasticize the injection mixture 46 before injection.

The nozzle unit 56 is movable into and out of operative association with the nozzle inlet 44 upon a reciprocal movement of a carriage 64 relative to the main frame 54. This reciprocal movement is responsive to the operation of a double acting cylinder 66 pivotally interconnected between the carriage 64 and the main frame 54. The operation of the double acting cylinder 66 is controlled by a second linear actuator 68 mounted on the mainframe 54 for coacting engagement with a limit member 70 on the carriage 64.

The injection assembly 50 is operably coupled to the central processing unit 74 which monitors the progress of the injection process and feeds back responsive information regarding this progress to the injection assembly 50 (FIG. 1).

In a preferred embodiment the central processing unit 74 is a personal computer, but the central processing unit 74 may, of course, be any system capable of receiving user input variables, monitoring the progress of a plastic injection run, and controlling the injection in response thereto. The central processing unit 74 is equipped with an input device 76 and a viewing screen 78. To monitor the rate of injection mixture 46, a shot size transducer 80 is coupled to the injection screw 60 to monitor the distance that the injection screw 60 travels. The shot size transducer 80 is a linear actuator which correlates movement of the injection screw 60 to a predetermined amount of the injection mixture 46 injected into the mold cavity 40. The shot size transducer is connected to the central processing unit 74 in order to give feedback to the central processing unit 74. As each incremental amount of the injection mixture 46 within the injection assembly 50 is injected into the mold cavity 40, the shot size transducer 80 monitors the associated incremental movement of the injection screw 60. Preferably the shot size transducer 80 measures increments of injection mixture 46 of one gram or less, which translates into approximately four thousand increments for a typical molding operation.

To monitor the pressure at which the injection mixture 46 is injected into the mold cavity 40, a pressure monitor 82 is operably coupled to the hydraulic pump 62 (FIG. 1). The pressure monitor 82 is also coupled to the central processing unit 74. The central processing unit 74 is operably coupled to an injection control 84 which is, in turn, coupled to the hydraulic pump 62 to manipulate the injection of the injection mixture 46.

At the beginning of the molding process the hydraulic piston 16 is actuated to force the piston ram 32 toward the first plate 20. The platen 30 disburses the force of the piston ram 32 to the mold carriage 26 and the second mold section 38. The second mold section 38 is moved toward the first mold section 36 until a mold cavity 40 of an initial volume is formed. In the preferred embodiment of the present invention, this initial volume of the mold cavity 40 is the volume formed when the second mold section 38 has been moved as far as possible toward the first mold section 36 (FIG. 2a). It should be noted, however, that an infinite number of initial volumes for mold cavity 40 may be chosen, including the case where the mold cavity 40 has no volume until the injection mixture 46 pushes the second mold section 38 away from the first mold section 36.

The injection mixture 46 includes a blowing agent mixed with a plastic injection material. Although several blowing agents are known in the art, in the preferred embodiment the blowing agent is azodicarbonamide. Azodicarbonamide decomposes when heated to produce a gas. The ratio of the blowing agent to the plastic injection material is determined by process parameters, part or design, or desired application for the plastic part. In the preferred embodiment of the present invention azodicarbonamide is added to polypropylene at the approximate ratio of one part azodicarbonamide to ninety-nine parts polypropylene to produce the injection mixture 46. Polyurethane, polystyrene, or any other suitable plastic material may be used instead of polypropylene. For example, ethylene vinyl acetate (EVA) can be mixed in the injection mixture 46 and comprises a thermoplastic material that will produce a relatively pliable injection molded article. Injection molded articles which contain EVA, and molded according to the method of the present invention, will retain superior compressibility and memory for compressibility. Thermoplastic materials like polypropylene or polyethylene such as HDPE (high density polyethylene) comprise thermoplastic materials that will produce substantially rigid injection molded, particularly well suited for uses as floats.

Regardless of the exact composition of the injection mixture 46, the injection mixture 46 is heated to an injection temperature and injected into the molding cavity 40. The injection temperature is hot enough to plasticize the injection mixture 46, and hot enough that the blowing agent will decompose, or be activated, unless the injection mixture 46 is pressurized. In the preferred embodiment the injection temperature is approximately 400 degrees Fahrenheit.

Figure 12:
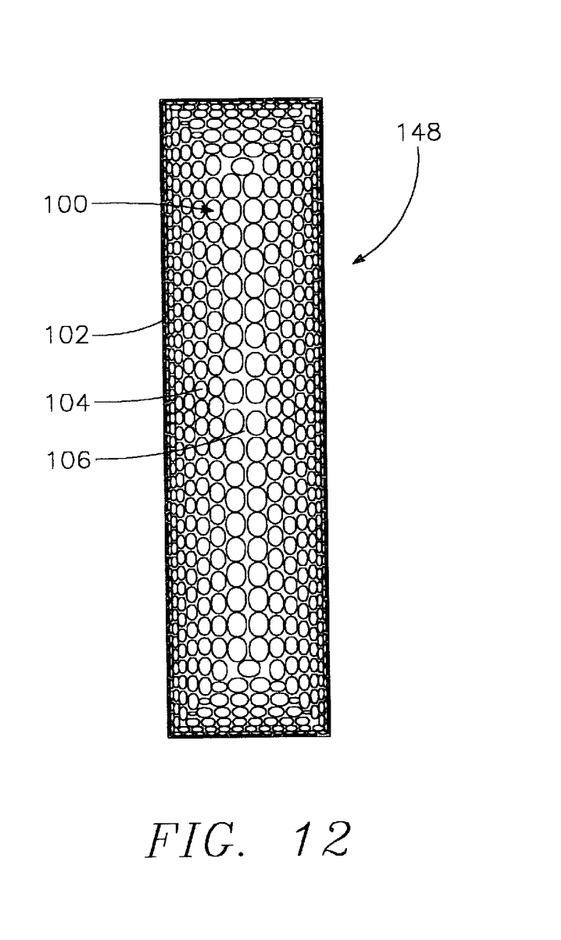
FIG. 12 is a cross-sectional view of an injection molded article.

Before the injection mixture 46 is injected into the mold cavity 40, it is first plasticized to provide a flowable material which eventually hardens into a finished plastic article 148 (FIG. 12). The following parameters affect the plasticization process: the type of raw plastic material to be plasticized, throat temperature, the temperature of injection assembly heating zones, the size, length and type of screw 60, the rate at which the screw 60 is turned, and the rate at which the screw 60 is allowed to move back. Of these parameters, only the type of raw plastic material and screw dimensions are not directly controlled by a computer control program within the central processing unit 74. The computer control program controls the operation of the central processing unit 74, and therefore generally controls the injection molding apparatus and process. The throat temperature and temperature of injection assembly heating zones are controlled by standard proportion integral derivative (PID) control algorithms. The computer control program controls the rate at which the screw 60 is turned so that the rate is directly proportional to the rate of oil produced by a variable vane hydraulic pump. The computer control program directly controls the rate at which the oil is delivered by the hydraulic pump 62 by supplying two set points, a rate set point and a maximum pressure set point. The rate set point specifies the rate of oil flow requested, while the maximum pressure set point specifies a maximum pressure limit. Consequently, since pressure is a function of rate of flow times a resistance, the maximum pressure set point will limit the rate of flow in the case when maximum pressure is obtained. Preferably, the rate at which the screw 60 turns during the plasticization process is profiled. Profiling causes the screw 60 to turn at different rates during the plasticization cycle.

The rate at which the screw 60 is allowed to move back is also controlled by the computer control program. The profiled turning of the screw 60 during the plasticization process causes the injection mixture 46 to be metered to an area in front of the screw 60. The injection mixture 46 being metered forward causes a counter plastic pressure attempting to force the screw 60 backward. The rate at which the screw 60 moves backward, from the counter pressure of the injection mixture 46 being metered forward, is profiled by the computer control program. Profiling of the rate of movement backward allows for variations in the amount of time the injection mixture 46 is mixed by the screw 60, as well as profiling the amount of frictional heat created by the screw 60 turning which is induced into the injection mixture 46. The computer control program specifies this profile by supplying a back pressure set point to a variable hydraulic back pressure valve.

Like the plasticization process, the injection process is also controlled by the computer control program. The parameters associated with the injection process include the following: the type of raw injection mixture 46 to be injected; the temperature of the injection mixture 46; the size, length and type of screw 60; the rate at which the injection mixture 46 is injected; the mold design; and the mold temperature. Preferably, both the temperature of the injection mixture 46 and the rate at which the injection mixture 46 is injected are controlled by the computer control program.

A critical parameter in the injection process comprises the activation rate of the blowing agent in the injection mixture 46. The activation rate is controlled by the following interrelated parameters, the temperature of the injection mixture 46, the temperature of the first and second mold sections 36, 38, the injection rate, and the pressure within the mold cavity 40. Of course, mold cavity pressure clearly depends on the volume of the mold cavity 40. The blowing agent activates above a specific temperature, or pressure since temperature and pressure are related. If the temperature of the blowing agent is held below the activation temperature the blowing agent cannot activate or stops activating depending on the circumstances. Once above the activation temperature, the pressure of the mold cavity 40 determines the activation rate. For example, the greater the volume of the mold cavity 40 the lower the pressure and the more space available for the blowing agent to activate, thus allowing the blowing agent to create larger cells. In other words, the more active the blowing agent, the larger the cellular structure within the injection molded article 148 (FIG. 12), which in turn creates a low density area within the injection molded article 148. Conversely, reducing the volume of the mold cavity 40 increases the pressure and reduces the activation rate of the blowing agent, which reduces the cellular structure of the injection molded article 148 thereby creating a high density area within the injection molded article 148. Thus, through manipulation of the above-identified parameters the activation of the blowing agent within the injection mixture 46 is controlled to create the injection molded article 148 with a controlled first cellular density distribution 100. Accordingly, the term cellular density is used throughout to refer not only to the number of cells within a given area, but also to the size of the cells in that given area. Thus, an area of low cellular density contains not only large cells but a small number of cells relative to the same sized area of high cellular density. The high cellular density area would contain more cells and smaller cells than the same sized area of low cellular density.

To control the temperature of injection mixture 46, as the injection mixture 46 enters the mold cavity 40 during injection, the central processing unit 74 controls several parameters. In the preferred embodiment, the central processing unit 74 receives feedback as to the injection temperature from a temperature sensor 126 near the nozzle inlet 44 (FIG. 1). The heater bin temperature is manipulated during the plasticization process and frictional heat is controlled during both the plasticization and back pressure cycles. Additionally, frictional heat developed from the injection mixture 46 moving through the injection nozzle during the injection process is controlled to provide the optimum amount of heat into the injection mixture 46.

The computer control program also controls the rate at which the injection mixture 46 is injected, during the injection cycle. Typically, a predetermined profile determines the rate at which the injection material 46 is to be injected during the injection cycle. A common profile specifies the required rate and maximum pressure set points to the variable vane pump supplying a profile of oil flow to the cylinders attached to the screw 60. A typical injection profile will begin at a slow injection rate with the pump set to allow for maximum pressure. As the mold cavity 40 fills, the rate proportionally increases to the optimum rate for the filling of the mold cavity 40. At some point during the filling of the mold cavity 40 the maximum pressure set point of the hydraulic pump 62 is lowered to a value which prevents the injection pressure from overcoming the clamp pressure. The remainder of the material is injected into the mold cavity 40 allowing the pressure compensation characteristics of the pump to control the rate at which the injection mixture 46 is injected.

The computer control program also controls the volume of the mold cavity by controlling the movement of the hydraulic piston 16. Through computer connection, the computer 74 manipulates the hydraulic piston 16, and therefore the movement of the mold carriage 26 and the attached second mold section 38. In this manner, the computer controls not only the formation of the mold cavity 40 but the volume of the mold cavity 40.

Figure 5:
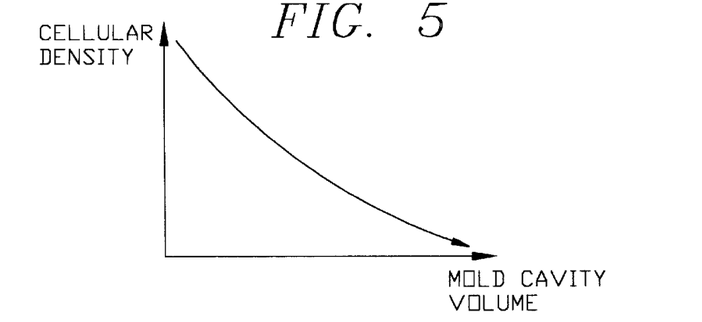
FIG. 5 is a graphical representation of the relationship between the cellular density and the mold cavity volume.

With regard to the formation of an injection molded article 148 with a first cellular density distribution 100, the computer control program operates according to a predetermined control function. This control function depends on the volume of the mold cavity 40 and the injection rate of the injection mixture 46 into the mold cavity 40. FIG. 5 shows the general mathematical relationship between the cellular density of the injection molded article 148 and the volume of the mold cavity 40 as defined by the control function. The control function defines an inverse relationship between the cellular density and the volume of the mold cavity 40. In other words, the smaller the mold cavity 40 the smaller the cells created by the blowing agent, and therefore the more dense the cellular structure of the injection molded article 148. As the volume of the mold cavity 40 increases the pressure within the mold cavity 40 decreases. Presuming the preheating of the injection mixture 46 above the activation temperature of the blowing agent, this pressure drop allows for increased blowing agent activity. Increasing the volume of the mold cavity 40 creates room for the blowing agent to activate, thereby creating larger cells. This increased blowing agent activity creates a larger cellular structure within the injection molded article 148, and therefore a lower cellular density. The inverse relationship between the cellular density and the volume of the mold cavity 40 can take many forms, depending on the configuration of the molding apparatus. For example, the relationship might be linear, or represented by an N-degree polynomial, or exponential function. The inverse relationship between the cellular density and the volume of the mold cavity 40 can be expressed in terms of many other mathematical functions, just so long as the function defines an inverse relationship between the cellular density and the volume of the mold cavity 40.

Figure 6:
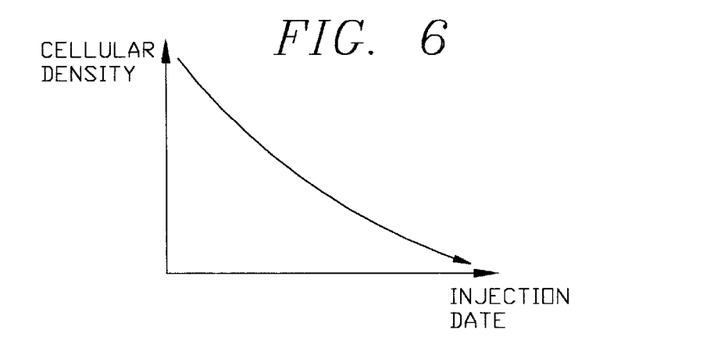
FIG. 6 is a graphical representation of the relationship between the cellular density and the injection rate.

FIG. 6 shows the mathematical relationship between the cellular density and the injection rate as defined by the control function. The control function defines a direct relationship between the cellular density and the injection rate. Presuming the pre-heating of the injection mixture 46 above the activation temperature of the blowing agent, a low injection rate reduces the amount of injection mixture 46 within the mold cavity 40 which creates space for the blowing agent within the injection mixture 46 to activate. This produces large cells and a low cellular density. Higher injection rates increase the amount of injection mixture 46 within the mold cavity 40, which correspondingly increases the pressure in the mold cavity 40. This reduces the space available for the blowing agent to activate, thereby reducing the cell size and increasing the density of the injection molded article 148. The direct relationship between the cellular density and the injection rate can take many forms, depending on the configuration of the molding apparatus. For example, the relationship might be linear, or represented by an N-degree polynomial, or exponential function. The inverse relationship between the cellular density and the injection rate can be expressed in terms of many other mathematical functions, just so long as the function defines an inverse relationship between the cellular density and the injection rate.

Figure 2B:
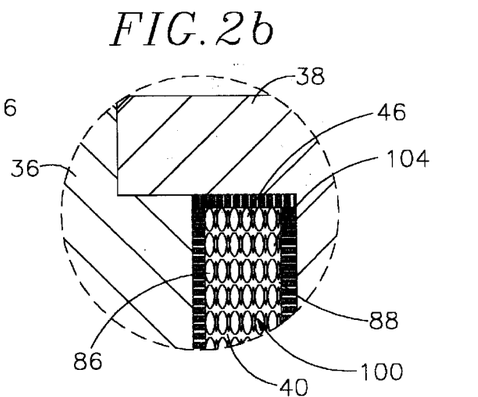
FIG. 2b is an expanded cross-sectional view of the cellular density distribution of an injection molded article during the first molding period.

The following describes the sequence of events involved in creating the injection molded article 148 with the first cellular density distribution 100. First, the injection mixture 46 is heated, through manipulation of the heater bin temperatures and the frictional heating during the injection process, to ensure that the injection mixture 46 enters the nozzle inlet 44 at a temperature above the activation temperature of the blowing agent. Then following formation of the mold cavity 40 the injection mixture 46 begins to enter the mold cavity 40 during a first molding period 108 (FIGS. 2a–b, FIG. 8).

Figure 8:
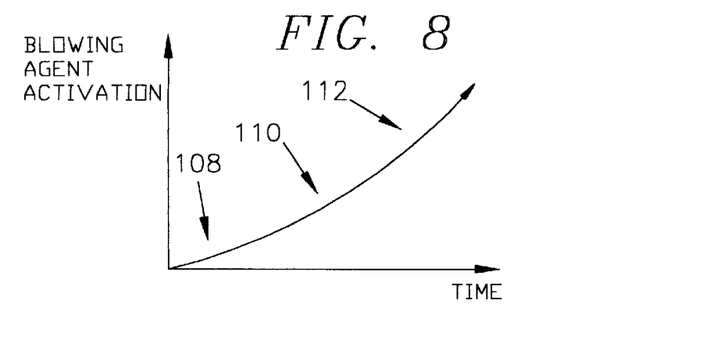
FIG. 8 is a graphical representation of the relationship between the blowing agent activation rate and the molding time.

FIG. 8 depicts the blowing agent activation rate versus molding time and shows that the first molding period 108 takes place at the beginning of the injection molding cycle. Additionally, the first molding period 108 represents the period in which the blowing agent begins to activate. During the first molding period 108 the control function of the computer control program, controls the volume of the mold cavity 40 and the injection rate to minimize the activity of the blowing agent. In this manner, the first cellular density distribution 100 begins to form with the formation of a first cellular structure 102 (FIGS. 2a–b). The first cellular structure 102 is comprised of a high concentration of small cells. During this first molding period 108 the blowing agent activation rate is at a very low level (FIG. 8). By maintaining the mold cavity 40 at its smallest volume, and maintaining a relatively high injection rate, as shown in FIG. 5, FIG. 6, and FIG. 8, the blowing agent begins to activate. FIG. 2b shows that the first cellular structure 102 contains a high density arrangement of small cells. The reduced volume of the mold cavity 40 arid the relatively high injection rate leaves little space in the mold cavity, thus the blowing agent forms only small cells. Consequently, during the first molding period 108 a first cellular structure 102 of the first cellular density distribution 100 is formed at the exterior of the injection molded article 148. The first cellular structure 102 is comprised of a high density of cells, formed during a period of low blowing agent activity. Thus, the first cellular structure 102 contains a point at which the cellular density within the injection molded article 148 reaches a maximum, and the cellular density within the first cellular structure 102 will vary from this point of maximum density to points of lower density.

Additionally, control of the temperatures of the molding surfaces 86, 88 can further effect the first cellular structure 102 of the first cellular density distribution 100, formed during the first molding period 108. Controlling the temperature of the molding surfaces, for example with cooling means 124, allows the blowing agent in the injection mixture near the molding surfaces 86, 88 to cool to a temperature below the activation temperature. Thus, during the first molding period 108 where the activation rate of the blowing agent is already at its lowest level, the blowing agent in the injection mixture becomes permanently inactive by cooling the outer portion of the injection molded article 148 below the activation temperature. In this manner, it is possible that during at least a portion of the first molding period 108 the blowing agent will not activate at all. This would produce a first cellular structure 102 of the first cellular density distribution 100 in which at least a portion of the first cellular structure 102 contains no blowing agent activated cells. Thus, the injection molded article 148 contains a smooth dense outer skin.

Figure 3A:
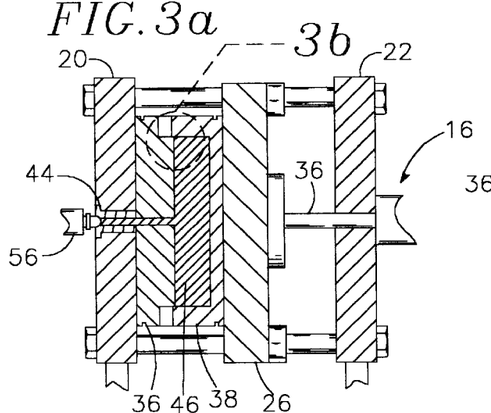
FIG. 3a is a cross-sectional view of the mold unit of the injection molding machine of FIG. during a second molding period.
Figure 3B:
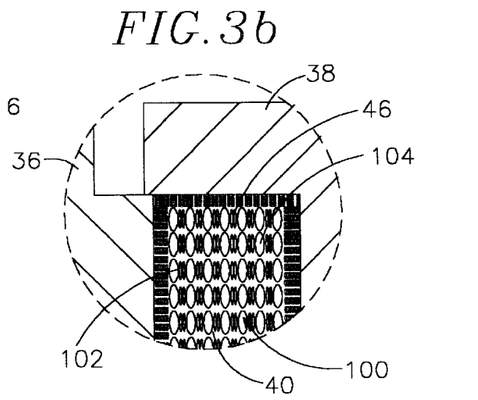
FIG. 3b is an expanded cross-sectional view of the cellular density distribution of the injection molded article during the second molding period.

Next, during a second molding period 110 the control function of the computer control program controls the volume of the mold cavity 40 and the injection rate to gradually increase the activation rate of the blowing agent (FIG. 8). By gradually expanding the volume of the mold cavity 40 and/or slowing the injection rate of the injection mixture 46 into the mold cavity 40, FIGS. 5–6 show that the cellular density decreases. In other words, the increase in the volume of the mold cavity 40 and a decrease in the injection rate both serve to reduce the pressure within the mold cavity 40. This creates space in the mold cavity 40 for the blowing agent to activate. A gradual increase in the available mold cavity space translates into an gradual increase in the activation rate of the blowing agent (FIG. 8). This in turn translates into a gradual transition from smaller cells to larger cells within the injection molded article 148 (FIGS. 3a–b). FIG. 3b shows the gradual transition between the high density first cellular structure 102 and the lower density transitional cellular structure 104. In this manner, during the second molding period 110 the transitional cellular structure 104 of the density distribution 100 forms in an area away from the exterior of the injection molded article 148.

Figure 4A:
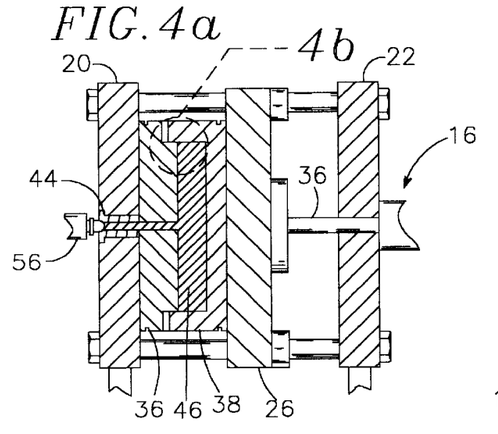
FIG. 4a is a cross-sectional view of the mold unit of the injection molding machine of FIG. 1 during a third molding period.
Figure 4B:
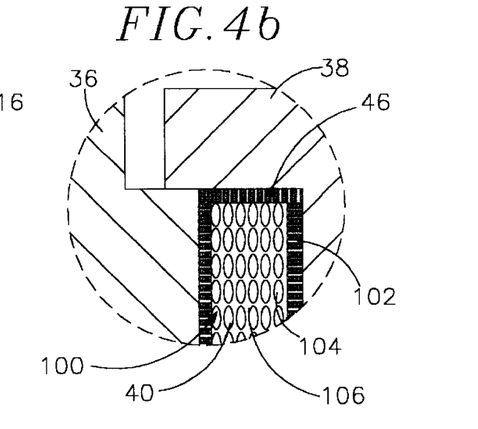
FIG. 4b is an expanded cross-sectional view of the cellular density distribution of the injection molded article during the third molding period.
Figure 7:
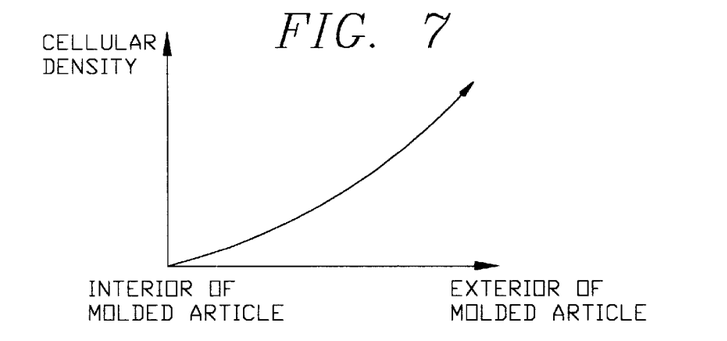
FIG. 7 is a graphical representation of the relationship between the cellular density and the cross-sectional area of the injection molded article.

Next, during a third molding period 112 the control function of the computer control program controls the volume of the mold cavity 40 and the injection rate to form a second cellular structure 106 (FIGS. 4a–b, 8). Again, by continuing to gradually expand the volume of the mold cavity 40, and/or by slowing the injection rate of the injection mixture 46 into the mold cavity 40, FIGS. 5–6 shows that the cellular density continues to decrease. During the third molding period 112 the activation rate of the blowing agent reaches a maximum value (FIG. 8). Thus, a second cellular structure 106 forms and contains a point at which the cellular density within the injection molded article 148 reaches a maximum, and the cellular density within the second cellular structure 106 will vary from this point of maximum density to points of lower density. Accordingly, the cell size the cells formed during a third molding period 112 reaches a maximum, and correspondingly the first cellular density distribution 100 reaches a minimum density level (FIG. 4b). In this manner, the injection molded article 148 contains a first cellular density distribution 100 which varies gradually from a high density first cellular structure 102 located at the exterior of the injection molded article 148, to a relatively low density second cellular structure 106 located at the interior of the injection molded article 148 (FIG. 7). The first cellular density distribution 100 also contains a transitional cellular structure 104 located between the first cellular structure 102 and the second cellular structure 106. The transitional cellular structure 104 gradually transitions between the high density first cellular structure 102 and the second cellular structure 106 of relatively lower density.

The gradual nature of the transition is determined by the control function of the computer control program. As mentioned hereinabove, the control function depends on the volume of the mold cavity 40 and the injection rate. Thus, the equation of the lines shown in FIGS. 5–6 must be capable of expression in the form of some continuous smooth function, as opposed to a discrete functions like for example a step function. In order to produce the gradually varying cellular density distribution 100 the function that describe the behavior of the relationship between the cellular density, and the volume of the mold cavity 40 and/or the injection rate, when depicted graphically must produce a smooth unbroken continuous line, like those depicted in FIGS. 5–6. However, the exact slope and curvature can take many forms depending on the actual control function.

Furthermore, the injection molded article 148 tends to cool from the outside in. This means that the blowing agent in the injection material 46 located at the exterior of the injection molded article 148 cools below the activation temperature of the blowing agent, prior to the injection material 46 located at the center of the injection molded article 148. Thus, as the molding periods 108, 110, 112 progress the cellular structure becomes stable, and subsequent changes effected by the control function of the computer control program will not affect the already stabilized structures. In this manner, the control function of the computer control program operates to affect the activation rate of the blowing agent only in the molten injection mixture 46.

Figure 9:
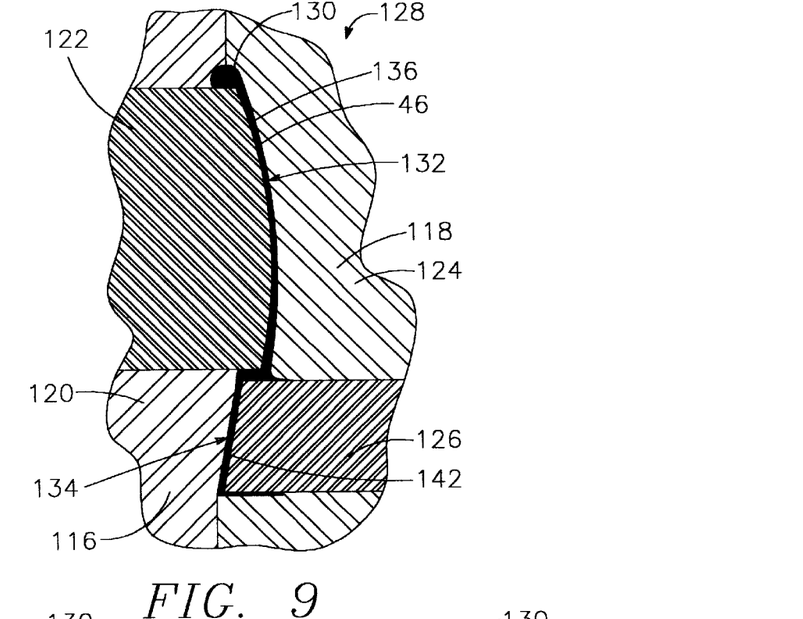
FIG. 9 is a partial cross-sectional view of an alternative mold unit during a first molding period.
Figure 10:
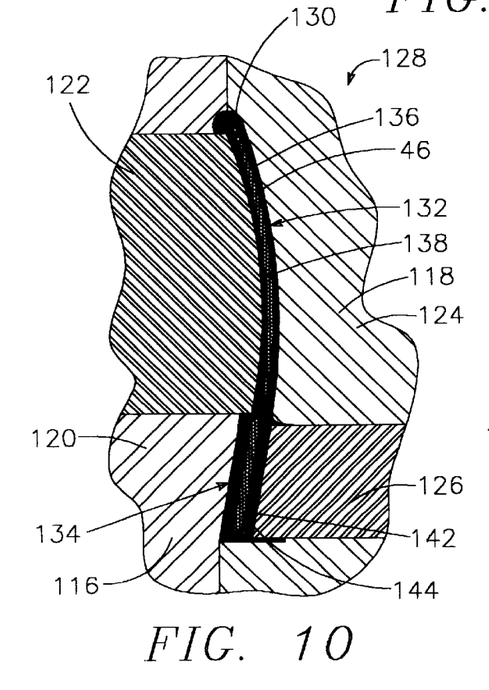
FIG. 10 is a partial cross-sectional view of the alternative mold unit during a second molding period.
Figure 11:
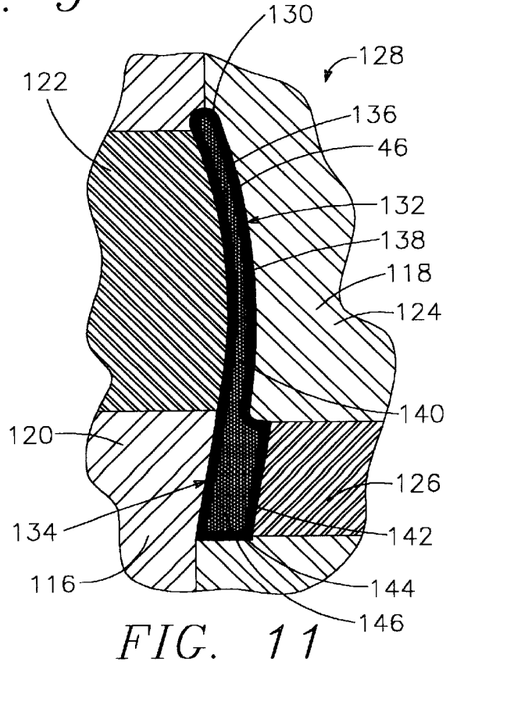
FIG. 11 is a partial cross-sectional view of the alternative mold unit during a third molding period.
Figure 13:
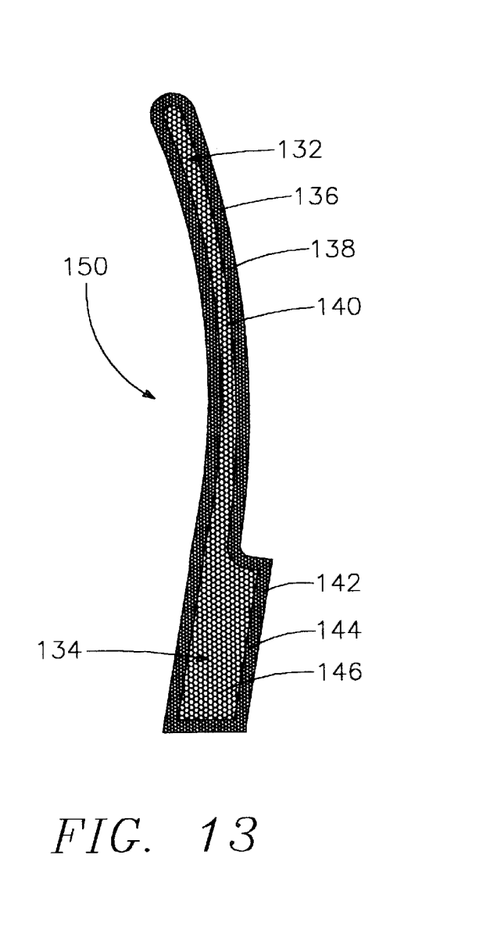
FIG. 13 is a cross-sectional view of an injection molded article.

FIGS. 9–11 show another embodiment of the present invention used to create an injection molded article 150 with two or more cellular density distributions 132, 134. This embodiment is capable of creating, for example, an injection molded shoe sole, where the heel of the shoe sole is comprised of a second cellular density distribution 134 and the ball of the shoe sole is comprised of a first cellular density distribution 132 (FIG. 13).

FIGS. 9–11 show a partial cross-section of a mold unit 128 which is adaptable to the molding apparatus 10 shown in FIG. 1. The mold unit 128 contains a first mold section 116 and a second mold section 118. The first mold section 116 has a stationary portion 120 and a movable portion 122, which moves relative to the stationary portion 120. The movable mold portion 122 can be moved hydraulically, pneumatically, electrically, servo-electrically, or by any other suitable or equivalent means. In a similar manner, the second mold section 118 has a stationary portion 124 and a movable portion 126, which moves relative to the stationary portion 120. The movable mold portion 126 can be moved hydraulically, pneumatically, electrically, servo-electrically, or by any other suitable or equivalent means. The injection process begins with the formation of a mold cavity 130 formed by engaging the first mold section 116 and the second mold section 118 of the mold unit 128. The injection mixture 46 is heated in the aforementioned manner, and then the injection mixture 46 is injected into the mold cavity 130 at a temperature above the activation temperature of the blowing agent.

FIG. 9 depicts the mold unit 128 during the first molding period 108 (FIG. 8). During the first molding period 108, a first and a second predetermined control function of the computer control program control the volume of the mold cavity 130 and the injection rate to minimize the activity of the blowing agent. The volume of the mold cavity 130 and the injection rate are controlled such that the first density distribution 132 and the second density distribution 134 begin to form. During the first molding period 108 a first cellular structure 136 of the first cellular density distribution 132 begins to form. The first cellular structure 136 of the first cellular density distribution 132 is comprised of a high concentration of small cells, due to the constricted volume of the mold cavity 130. Additionally, during the first molding period 108 a first cellular structure 142 of a second cellular density distribution 134 also begins to form. The first cellular structure 142 of the second cellular density distribution 134 is also comprised of a high concentration of small cells, due to the constricted volume of the mold cavity 130. However, the first control function and the second control function are distinct functions which create distinct cellular structures. In this manner, the first cellular density distribution 132 and the second cellular density distribution 134 comprise unique distributions. It is anticipated that those skilled in the art will recognize that nearly infinite variations in the first and second control functions can create nearly infinite variations in the first cellular density distribution 132 and the second cellular density distribution 134.

Next, during a second molding period 110 the first and second control functions of the computer control program control the volume of the mold cavity 130 and the injection rate to gradually increase the activation rate of the blowing agent (FIG. 10, FIG. 8). By gradually expanding the volume of the mold cavity 130 and/or slowing the injection rate of the injection mixture 46 into the mold cavity 130, FIGS. 5–6 show that the cellular density decreases. The volume of the mold cavity 130 expands through movement of the movable portion 122 of the first mold section 116, and through the movement of the movable portion 126 of the second mold section 118 (FIG. 10). The movement of the movable mold sections 122, 126 and the variations in the injection rate thereby create a transitional cellular structure 138 of the first cellular density distribution 132, and a transitional cellular structure 144 of the second cellular density distribution 134. The increase in the volume of the mold cavity 130 and/or the decrease in the injection rate of the injection mixture 46 creates space within the mold cavity 130 to allow the blowing agent activation rate to increase. In other words, increases in the volume of the mold cavity and decreases in the amount of injection mixture 46 entering the mold cavity allow the blowing agent to activate at a higher rate because of the corresponding decrease in the pressure within the mold cavity. A gradual increase in the space available in the mold cavity 130 translates into an gradual increase in the activation rate of the blowing agent (FIG. 8). This in turn, translates into a gradual transition from smaller cells to larger cells within the injection molded article 150 (FIG. 10, FIG. 13).

Next, during a third molding period 112 the first and second control functions of the computer control program control the volume of the mold cavity 130 and the injection rate to form a second cellular structure 140 of the first cellular density distribution 132, and a second cellular structure 146 of the second cellular density distribution 134 (FIG. 11, FIG. 8). Again, by continuing to gradually expand the volume of the mold cavity 130, through movement of the movable portion 122 of the first mold section 116 and the movable portion 126 of the second mold section 118, and/or by slowing the injection rate of the injection mixture 46 into the mold cavity 130, FIG. 11 shows that the overall cellular density decreases. During the third molding period 112 the activation rate of the blowing agent reaches a maximum value (FIG. 8). Accordingly, the cell size also reaches a maximum, and the first cellular density distribution 132 and the second cellular density distribution 134 reaches a minimum density level (FIG. 11).

In a manner similar to that describe above for the first cellular density distribution 100 of the injection molded article 148, the first cellular structure 136 of the first density distribution 132 and the first cellular structure 142 of the second density distribution 134 of the injection molded article 150 both contain a point at which the cellular density within the injection molded article 150 reaches a maximum, and the cellular density of the first cellular structure 136 of the first density distribution 132 and the first cellular structure 142 of the second density distribution 134 will vary from this point of maximum density to points of lower density. Likewise, the second cellular structure 140 of the first density distribution 132 and the second cellular structure 146 of the second density distribution 134 of the injection molded article 150 both contain a point at which the cellular density within the injection molded article 150 reaches a minimum, and the cellular density of the second cellular structure 140 of the first density distribution 132 and the second cellular structure 146 of the second density distribution 134 will vary from this point of minimum density to points of higher density.

In this manner, FIG. 13 shows that the injection molded article 150 contains a first cellular density distribution 132 which varies gradually from a high density first cellular structure 136 located at the exterior of the injection molded article 150, to a relatively low density second cellular structure 140 located at the interior of the injection molded article 150. The first cellular density distribution 132 also contains a transitional cellular structure 138 located between the first cellular structure 136 and the second cellular structure 140. The transitional cellular structure 138 gradually transitions between the high density first cellular structure 136 and the second cellular structure 140 of relatively lower density. In a similar manner, the injection molded article 150 also contains a second cellular density distribution 134 which varies gradually from a high density first cellular structure 142 located at the exterior of the injection molded article 150, to a relatively low density second cellular structure 146 located at the interior of the injection molded article 150. The second cellular density distribution 134 also contains a transitional cellular structure 144 located between the first cellular structure 142 and the second cellular structure 146. The transitional cellular structure 144 gradually transitions between the high density first cellular structure 142 and the second cellular structure 146 of relatively lower density.

The injection molded articles 148, 150, comprised of an injection mixture 46 which includes EVA, have the advantage of a tough wear resistant cover and a compressible core. Additionally, the injection molded article 150 contains two unique cellular density distributions 132, 134 each with unique compressibility. The varying cellular structure of the injection molded articles 148, 150 allows the injection molded articles 148, 150 to compress varying amounts when the injection molded articles 148, 150 experience varying amounts of pressure. The high density exteriors will compress first and experience minimal compression due to the small size of the cells, and as the pressure on the injection molded articles 148, 150 increases the low density interiors begins to compress. The low density interiors contains large cells and can, therefore, compress to a greater degree. Additionally, the injection molded articles 148, 150 return to their original sizes once the compression pressure is removed. Furthermore, injection molded articles 148, 150, comprised of an injection mixture 46 which include materials like polypropylene or polyethylene, have the advantage of a specific weight distribution within the injection molded articles 148, 150 and are generally very light weight. Through control of the volume of the mold cavities 40, 130 and control of the injection rate of the injection mixture 46 into the mold cavities 40, 130 the weight and the weight distribution of the injection molded articles can be precisely controlled.

The foregoing description and drawings merely explain and illustrate the invention, and the invention is not limited thereto, except insofar as the claims are so limited as those skilled in the art who have the disclosure before them will be able to make modifications and variations therein without departing from the scope of the invention. For example, it is anticipated that the cellular density distributions can comprise numerous orientations of cellular structures like a density distribution that has a low density structure at the exterior of an injection molded article and a high density structure at the interior. Additionally, it is anticipated that the injection process can involve more than three molding periods. Further, it is anticipated that for injection molded articles with more than one cellular density distribution the molding periods for the individual cellular density distributions may not coincide in time.

I claim:

1. A method for the production of an injection molded article having a cellular density distribution whereby the cellular structure of said injection molded article varies gradually between a first cellular structure of high density and a second cellular structure of relatively lower density, said method comprising;

a) providing a first mold section;
   b) providing a second mold section capable of seated engagement with said first mold section;
   c) forming a mold cavity by moving said first and said second mold sections into seated engagement;
   d) providing an injection means;
   e) injecting an injection mixture into said mold cavity through said injection means, wherein said injection mixture comprises a blowing agent;
   f) creating a first cellular density distribution by varying the injection rate of the injection mixture and the volume of said mold cavity according to a first predetermined control function, thereby producing said injection molded article having said cellular structure which varies gradually between said first cellular structure of high density and said second cellular structure of relatively lower density.

2. The method in accordance with claim 1 wherein said volume of said mold cavity is varied by moving said first mold section relative to said second mold section.

3. The method in accordance with claim 2 wherein said injection mixture is initially maintained at a temperature above the activation temperature of said blowing agent.

4. The method in accordance with claim 3 wherein said step of creating a first cellular density distribution further comprises creating a first cellular structure of higher density during a first molding period wherein said injection rate of the injection mixture and said mold cavity volume are varied such that said blowing agent begins to activate, thereby forming said first cellular structure of higher density at the perimeter of said injection molded article.

5. The method in accordance with claim 4 wherein said step of creating a first cellular density distribution further comprises creating a transitional cellular structure between said first cellular structure of higher density and said second cellular structure of relatively lower density during a second molding period wherein said injection rate and said mold cavity volume are varied such that activation of said blowing agent gradually increases, thereby gradually varying said cellular structure of said injection molded article.

6. The method in accordance with claim 5 wherein said step of creating a first cellular density distribution further comprises creating a second cellular structure during a third molding period wherein said injection rate of the injection mixture and said mold cavity volume are varied such that activation of said blowing agent reaches a maximum, thereby forming said second cellular structure of relatively lower density in the interior of said injection molding article.

7. The method in accordance with claim 6 wherein said injection material further comprises a thermoplastic material which upon cooling is substantially rigid.

8. The method in accordance with claim 6 wherein said injection material further comprises a thermoplastic material which upon cooling is relatively pliable.

9. The method in accordance with claim 1 wherein said first mold section comprises a stationary portion and a movable portion capable of movement relative to said stationary portion, and said volume of said mold cavity is varied by moving said movable portion of said first mold section relative to said stationary portion of said first mold section.

10. The method in accordance with claim 9 wherein said second mold section comprises a stationary portion and a movable portion capable of movement relative to said stationary portion.

11. The method in accordance with claim 10 wherein said volume of said mold cavity is varied according to said first predetermined control function by moving said movable portion of said first mold section thereby creating said first cellular density distribution, and further comprising the step of creating a second cellular density distribution by varying said injection rate of the injection mixture and said volume of said mold cavity according to a second predetermined control function wherein said volume of said mold cavity is varied by the moving said movable portion of said second mold section.

12. The method invention in accordance with claim 1 wherein said step of creating a first cellular density distribution further comprises creating a transitional cellular structure between said first cellular structure of higher density and said second cellular structure of relatively lower density during said molding period wherein said injection rate and said mold cavity volume are varied such that activation of said blowing agent gradually increases, thereby gradually varying said cellular structure of said injection molded article.

13. A method for the production of an injection molded article having a first and a second cellular density distribution whereby the cellular structure of said injection molded article varies gradually between a first cellular structure of said first cellular density distribution of high density and a second cellular structure of said first cellular density distribution of relatively lower density, and said cellular structure of said injection molded article varies gradually between a first cellular structure of said second cellular density distribution of relatively lower density, said method comprising;
   a) providing a first mold section having a first stationary portion and a first movable portion capable of movement relative to said first stationary portion;
   b) providing a second mold section capable of seated engagement with said first mold section wherein said second mold section has a second stationary portion and a second movable portion capable of movement relative to said second stationary portion;
   c) forming a mold cavity by moving said first and said second mold sections into seated engagement;
   d) providing an injection means;
   e) providing an injection mixture wherein said injection mixture comprises a blowing agent;
   f) injecting said injection mixture into said mold cavity through said injection means wherein said injection mixture is initially maintained at a temperature above the activation temperature of said blowing agent;
   g) creating a first cellular density distribution by varying the injection rate of the injection mixture and the volume of said mold cavity according to a first predetermined control function, wherein said mold cavity volume is varied by moving said first movable portion of said first mold section, thereby producing said injection molded article having said first cellular density distribution which varies gradually between a first cellular structure of said first cellular density distribution of high density and a second cellular structure of said first cellular density distribution of relatively lower density, wherein said step of creating said first cellular density distribution comprises:
   i) creating said first cellular structure of said first cellular density distribution of high density during a first molding period wherein said injection rate of the injection mixture and said mold cavity volume are varied such that said blowing agent begins to activate, thereby forming said first cellular structure of said first cellular density distribution of high density at the perimeter of said injection molded article;
   ii) creating a transitional cellular structure of said first cellular density distribution during a second molding period wherein said injection rate of the injection mixture and said mold cavity volume are varied such that activation of said blowing agent gradually increases, thereby gradually varying said cellular structure of said injection molded article; and
   iii) creating said second cellular structure of said first cellular density distribution during a third molding period wherein said injection rate of the injection mixture and said mold cavity volume are varied such that activation of said blowing agent reaches a maximum, thereby forming said second cellular structure of said first cellular density distribution of relatively lower density in the interior of said injection molding article;
   h) creating a second cellular density distribution by varying the injection rate of the injection mixture and the volume of said mold cavity according to a second predetermined control function, wherein said mold cavity volume is varied by moving said second movable portion of said second mold section, thereby producing said injection molded article having said second cellular density distribution which varies gradually between a first cellular structure of said second cellular density distribution of high density and a cellular structure of said second cellular density distribution of relatively lower density, wherein said step of creating said second cellular density distribution comprises:
   i) creating said first cellular structure of said second cellular density distribution of high density during a first molding period wherein said injection rate of the injection mixture and said mold cavity volume are varied such that said blowing agent begins to activate, thereby forming said first cellular structure of said second cellular density distribution of high density at the perimeter of said injection molded article;
   ii) creating a transitional cellular structure of said second cellular density distribution during a second molding period wherein said injection rate of the injection mixture and said mold cavity volume are varied such that activation of said blowing agent gradually increases, thereby gradually varying said cellular structure of said injection molded article; and
   iii) creating said second cellular structure of said second cellular density distribution during a third molding period wherein said injection rate of the injection mixture and said mold cavity volume are varied such that activation of said blowing agent reaches a maximum, thereby forming said second cellular structure of said second cellular density distribution of relatively lower density in the interior of said injection molding article.

14. A method for the production of an injection molded article having a cellular density distribution whereby the cellular structure of said injection molded article varies gradually between a first cellular structure of high density and a second cellular structure of relatively lower density, said method comprising;

a) providing a first mold section;

b) providing a second mold section capable of seated engagement with said first mold section;

c) forming a mold cavity by moving said first and said second mold sections into seated engagement wherein the volume of said mold cavity is varied by moving said first mold section relative to said second mold section;

d) providing an injection means;

e) injecting an injection mixture into said mold cavity through said injection means, wherein said injection mixture comprises a blowing agent and wherein said injection mixture is initially maintained at a temperature above the activation temperature of said blowing agent;

f) creating a first cellular density distribution by varying the injection rate and the volume of said mold cavity according to a first predetermined control function, thereby producing said injection molded article having said cellular structure which varies gradually between said first cellular structure of high density and said second cellular structure of relatively lower density, wherein the first cellular structure of higher density is created during a first molding period in which said injection rate and said mold cavity volume are varied such that activation of said blowing agent is relatively low, thereby forming said first cellular structure of higher density at the perimeter of said injection molded article; and g) creating a transitional cellular structure between said first cellular structure of higher density and said second cellular structure of relatively lower density during a second molding period wherein said injection rate of the injection mixture and said mold cavity volume are varied such that activation of said blowing agent gradually increases, thereby gradually varying said cellular structure of said injection molded article, said transitional cellular structure located between a first cellular structure of higher density and a second cellular structure of relatively lower density.

15. The method in accordance with claim 14 wherein said step of creating a first cellular density distribution further comprises creating a second cellular structure during a third molding period wherein said injection rate of the injection mixture and said mold cavity volume are varied such that activation of said blowing agent is relatively high, thereby forming said second cellular structure of relatively lower density in the interior of said injection molding article.

16. The method in accordance with claim 15 wherein said injection material further comprises a thermoplastic material which upon cooling is substantially rigid.

17. The method in accordance with claim 15 wherein said injection material further comprises a thermoplastic material which upon cooling is relatively pliable.

18. A method for the production of an injection molded article having a cellular density distribution whereby the cellular structure of said injection molded article varies gradually between a first cellular structure of high density and a second cellular structure of relatively lower density, said method comprising;

a) providing a first mold section wherein said first mold section comprises a stationary portion and a movable portion capable of movement relative to said stationary portion, and the volume of said mold cavity is varied by moving said movable portion of said first mold section relative to said stationary portion of said first mold section;

b) providing a second mold section capable of seated engagement with said first mold section wherein said second mold section comprises a stationary portion and a movable portion capable of movement relative to said stationary portion;

c) forming a mold cavity by moving said first and said second mold sections into seated engagement;

d) providing an injection means;

e) injecting an injection mixture into said mold cavity through said injection means, wherein said injection mixture comprises a blowing agent;

f) creating a first cellular density distribution by varying the injection rate of the injection mixture and the volume of said mold cavity, wherein said volume of said mold cavity is varied according to said first predetermined control function by moving said movable portion of said first mold section thereby creating said first cellular density distribution; and g) creating a second cellular density distribution by varying said injection rate of the injection mixture and said volume of said mold cavity according to a second predetermined control function wherein said volume of said mold cavity is varied by the moving said movable portion of said second mold section, thereby producing said injection molded article having said cellular structure which varies gradually between said first cellular structure of high density and said second cellular structure of relatively lower density.

* * * * *